(12) United States Patent
Kim et al.

(10) Patent No.: US 10,723,355 B1
(45) Date of Patent: Jul. 28, 2020

(54) VEHICLE START CONTROL METHOD

(71) Applicants: HYUNDAI MOTOR COMPANY, Seoul (KR); KIA MOTORS CORPORATION, Seoul (KR)

(72) Inventors: Jin Sung Kim, Hwaseong-si (KR); Hwan Hur, Seoul (KR); Sung Hyun Cho, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/434,810

(22) Filed: Jun. 7, 2019

(30) Foreign Application Priority Data

Feb. 19, 2019 (KR) .................... 10-2019-0018902

(51) Int. Cl.
*B60W 10/02* (2006.01)
*B60W 10/06* (2006.01)
*B60W 30/18* (2012.01)
*B60W 50/00* (2006.01)

(52) U.S. Cl.
CPC ...... *B60W 30/18027* (2013.01); *B60W 10/02* (2013.01); *B60W 10/06* (2013.01); *B60W 50/00* (2013.01); *B60W 2050/001* (2013.01); *B60W 2050/002* (2013.01); *B60W 2050/0008* (2013.01); *B60W 2050/0012* (2013.01); *B60W 2050/0026* (2013.01); *B60W 2050/0052* (2013.01); *B60W 2510/0241* (2013.01); *B60W 2510/0275* (2013.01); *B60W 2510/0638* (2013.01); *B60W 2710/025* (2013.01);
(Continued)

(58) Field of Classification Search
CPC ............... B60W 10/02; B60W 10/06; B60W 30/18027; B60W 30/18063; B60W 30/188; B60W 30/1882; B60W 2050/0008; B60W 2050/001; B60W 2510/0241; B60W 2510/0638; B60W 2520/10; B60W 2520/105; B60W 2710/025; B60W 2710/0666
See application file for complete search history.

(56) References Cited

U.S. PATENT DOCUMENTS 9,663,107 B2 * 5/2017 Kim ................ B60W 30/18027
2005/0177295 A1 * 8/2005 Rodrigues ............. F16D 48/066
701/67

(Continued)

FOREIGN PATENT DOCUMENTS

JP 2013-064456 A 4/2013
KR 10-1393882 B1 5/2014
(Continued)

*Primary Examiner* — Edwin A Young
(74) *Attorney, Agent, or Firm* — Morgan, Lewis & Bockius LLP

(57) ABSTRACT

A vehicle start control method includes: a condition determination step of determining, by a controller, whether or not it is necessary to control an engine torque in addition to a slip control of a clutch when a vehicle has started moving; and an engine control step of controlling, by the controller, the engine torque according to an engine error revolutions per minute (RPM) which is a difference between a target engine RPM and an actually measured engine RPM, when it is necessary to control the engine torque in addition to the slip control of the clutch.

11 Claims, 4 Drawing Sheets

(52) U.S. Cl.
CPC ............... *B60W 2710/027* (2013.01); *B60W 2710/0666* (2013.01); *B60W 2710/0672* (2013.01)

(56) References Cited

U.S. PATENT DOCUMENTS

| | | | |
|---|---|---|---|
| 2012/0109438 A1* | 5/2012 | Akebono | B60W 10/06 701/22 |
| 2015/0167758 A1* | 6/2015 | Kim | G01L 1/2206 701/68 |
| 2015/0337952 A1 | 11/2015 | Cho et al. | |

FOREIGN PATENT DOCUMENTS

| | | |
|---|---|---|
| KR | 10-1673813 B1 | 11/2016 |
| KR | 10-2018-0051889 A | 5/2018 |
| KR | 10-1916550 B1 | 11/2018 |

* cited by examiner

VEHICLE START CONTROL METHOD

CROSS REFERENCE TO RELATED APPLICATION

The present application claims priority to Korean Patent Application No. 10-2019-0018902, filed Feb. 19, 2019 in the Korean Intellectual Property Office, the entire contents of which is incorporated herein for all purposes by this reference.

TECHNICAL FIELD

The present disclosure relates to a vehicle control method capable of performing a slip control of a clutch at the time of starting a vehicle).

BACKGROUND

In a vehicle equipped with an automated manual transmission (AMT) or a dual clutch transmission (DCT), a controller controls a clutch depending on a driving situation so that the vehicle can run smoothly.

The term "start control" means a control in which a controller controls a clutch to synchronize the transmission input shaft speed with the engine speed when a driver operates an accelerator pedal to start or accelerate in a situation in which the vehicle is in a stop state or a creep driving state.

During the above-described start control, it is difficult to precisely predict the response of an engine torque according to the driver's operation of the accelerator pedal. Further, it is difficult to perform a proper start control since the transmission torque characteristic of the clutch is likely to change, and rattling and vibration may occur in the vehicle. Thus, the drivability of the vehicle may be hindered.

It should be understood that the foregoing description of the background art is provided merely for the purpose of promoting the understanding of the background of the present disclosure and should not to be accepted as acknowledging that the background art is known to those skilled in the art.

SUMMARY

The present disclosure provides a vehicle start control method, in which start control can be performed more stably in spite of the uncertainty of engine torque and the uncertainty of clutch transmission torque at the vehicle start time such that soft and smooth vehicle starting can be realized, thereby improving the merchantability of the vehicle.

According to an exemplary embodiment of the present disclosure, a vehicle start control method includes: a condition determination step of determining, by a controller, whether or not it is necessary to control an engine torque in addition to a slip control of a clutch when a vehicle has started moving; and an engine control step of controlling, by the controller, the engine torque according to an engine error revolutions per minute (RPM) which is a difference between a target engine RPM and an actually measured engine RPM, when it is necessary to control the engine torque in addition to the slip control of the clutch.

In the condition determination step, when a slip amount of the clutch when the vehicle has started is equal to or greater than a first reference value, the engine error RPM is equal to or greater than a second reference value, and a change amount in the engine RPM is equal to or greater than a third reference value, it may be determined that the engine torque needs to be further controlled.

In the condition determination step, it may be additionally determined whether or not a Traction Control System (TCS) is in the OFF state and whether or not a Hill-start Assist Control (HAC) is in the OFF state, and when both the TCS and the HAC are in the OFF state, it may be determined that the engine torque needs to be additionally controlled.

In the engine control step, a proportional component and an integral component corresponding to the engine error RPM may be separately obtained, and the engine torque may be controlled using a value obtained by subtracting the proportional component and the integral component from a basic engine torque.

The proportional component according to the engine error RPM and the integral component according to the engine error RPM may be determined by separate maps, respectively.

In the engine control step, a proportional component and an integral component may be obtained from a three-dimensional map of a proportional component according to the engine error RPM and a filtered engine error RPM change rate and a three-dimensional map of an integral component according to the engine error RPM and the filtered engine error RPM change rate, respectively, so that the engine torque may be controlled using a value obtained by subtracting the proportional component and the integral component from a basic engine torque.

When a slip amount of the clutch becomes less than a fourth reference value after the engine control step is initiated, the engine torque may be raised with a first slope.

When it is determined that the vehicle continues moving after the engine torque has been started to rise with the first slope, the engine torque may be raised with a second slope so as to converge to a basic engine torque.

When it is determined that the slip amount of the clutch becomes zero, the controller may determine that the vehicle continues moving.

The controller may execute the engine control step by requesting the EMS to control the engine torque in the engine control step.

The controller may calculate a feedforward component of clutch torque to control the clutch according to the target engine RPM, a change amount in the target engine RPM, and a basic engine torque, may calculate a feedback component to feedback control the clutch torque according to the engine error RPM, may control the clutch using a value obtained by adding the feedback component to the feedforward component.

According to the present disclosure, start control can be performed more stably in spite of the uncertainty of engine torque and the uncertainty of clutch transmission torque at the vehicle start time such that soft and smooth vehicle starting can be realized, thereby improving the merchantability of the vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
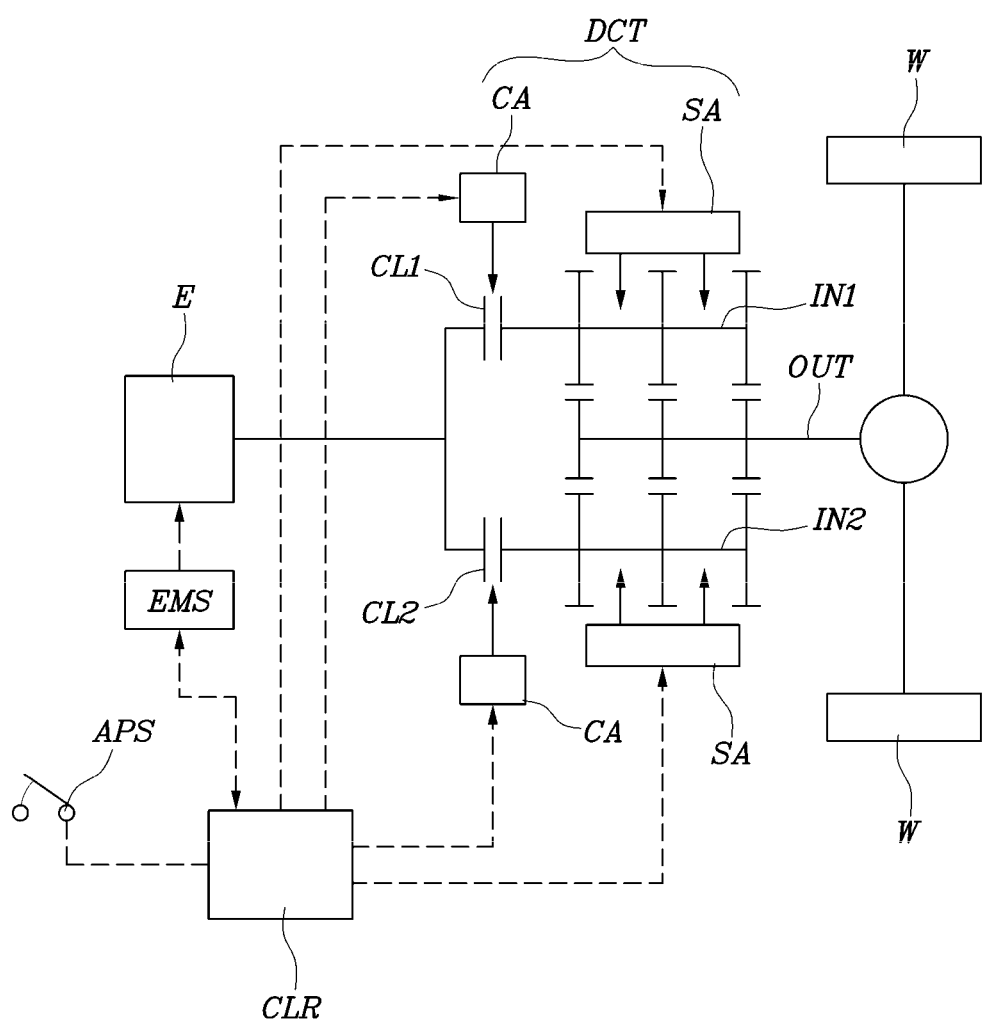
FIG. 1 is a configuration diagram of a dual clutch transmission (DCT)-equipped vehicle to which an exemplary embodiment of the present disclosure is applicable.

FIG. 1 is a configuration diagram of a dual clutch transmission (DCT)-equipped vehicle to which an exemplary embodiment of the present disclosure is applicable. The power of an engine E is transmitted to a first input shaft IN1 and a second input shaft IN2 through a first clutch CL1 and a second clutch CL2, respectively, is shifted, and is then supplied to driving wheels W through an output shaft OUT.

In addition, a clutch actuator CA for driving the first clutch CL1 and the second clutch CL2 and a shift actuator SA for performing shifting using selecting and shifting functions are provided and are controlled by the controller CLR, so that shifting is automatically performed.

The controller CLR is configured to control the clutch actuator CA and the shift actuator SA so as to automatically perform the shifting of the DCT according to the driving situation of the vehicle by receiving an accelerator pedal operation amount made by the driver through an accelerator position sensor (APS) and by additionally receiving information on the speed, the torque, and the vehicle speed of the engine E.

The engine E is controlled by a separate engine management system (EMS), and the controller CLR may receive information on the engine E by communicating with the EMS. When a request to adjust the torque of the engine E according to the driving situation and the shift state of the vehicle is received by the EMS, the EMS controls the engine E in consideration of the request.

For reference, the controller CLR described above may be configured as a transmission management system (TMS), and in some cases, may be configured as an integrated control system in which the EMS and the TMS are integrated.

Here, during the shifting, the first clutch CL1 and the second clutch CL2 perform a function of releasing one of the first clutch CL1 and the second clutch CL2 while the other is engaged. Depending on the shifting situation, one of the two clutches becomes a release side clutch, which is separated from the engine E and the other becomes an engaging side clutch, which is engaged with the engine E.

Hereinafter, the term "clutch" in the present disclosure means the clutch that is used at the vehicle start time among the first clutch and the second clutch, and, in the automated manual transmission (AMT) case, the clutch that transmits the power of the engine to the input shaft of the transmission.

Figure 2:
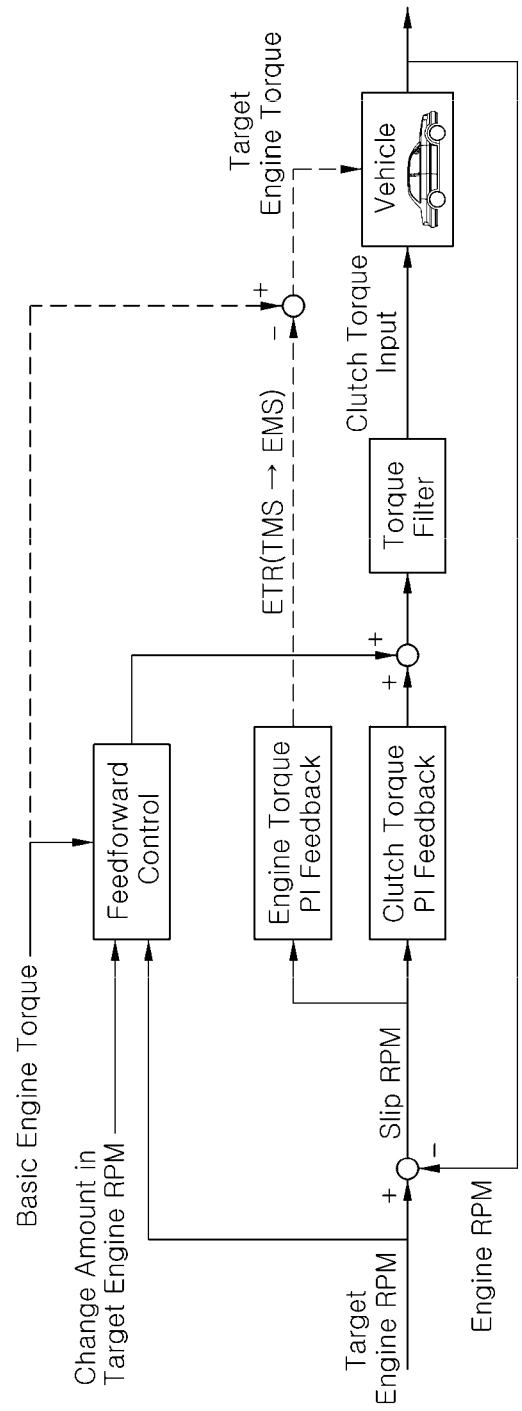
FIG. 2 is a block diagram illustrating a vehicle start control method according to an exemplary embodiment of the present disclosure.
Figure 3:
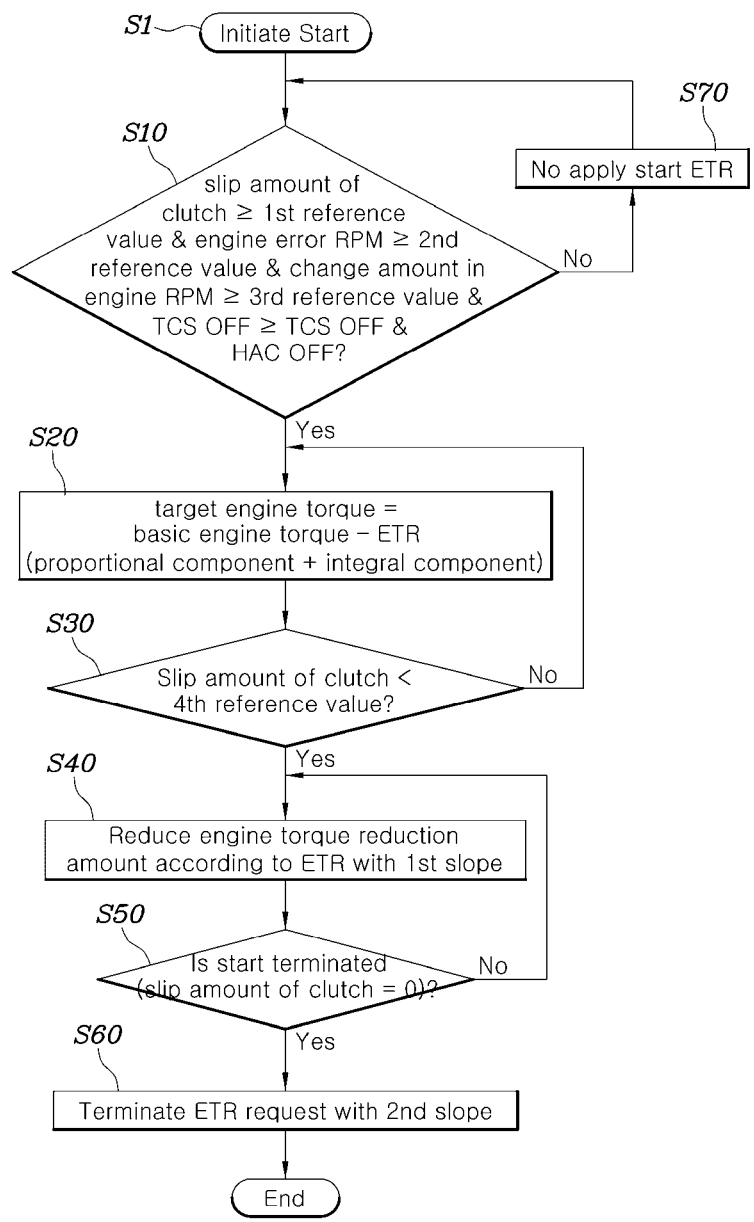
FIG. 3 is a flowchart illustrating a vehicle start control method according to an exemplary embodiment of the present disclosure.
Figure 4:
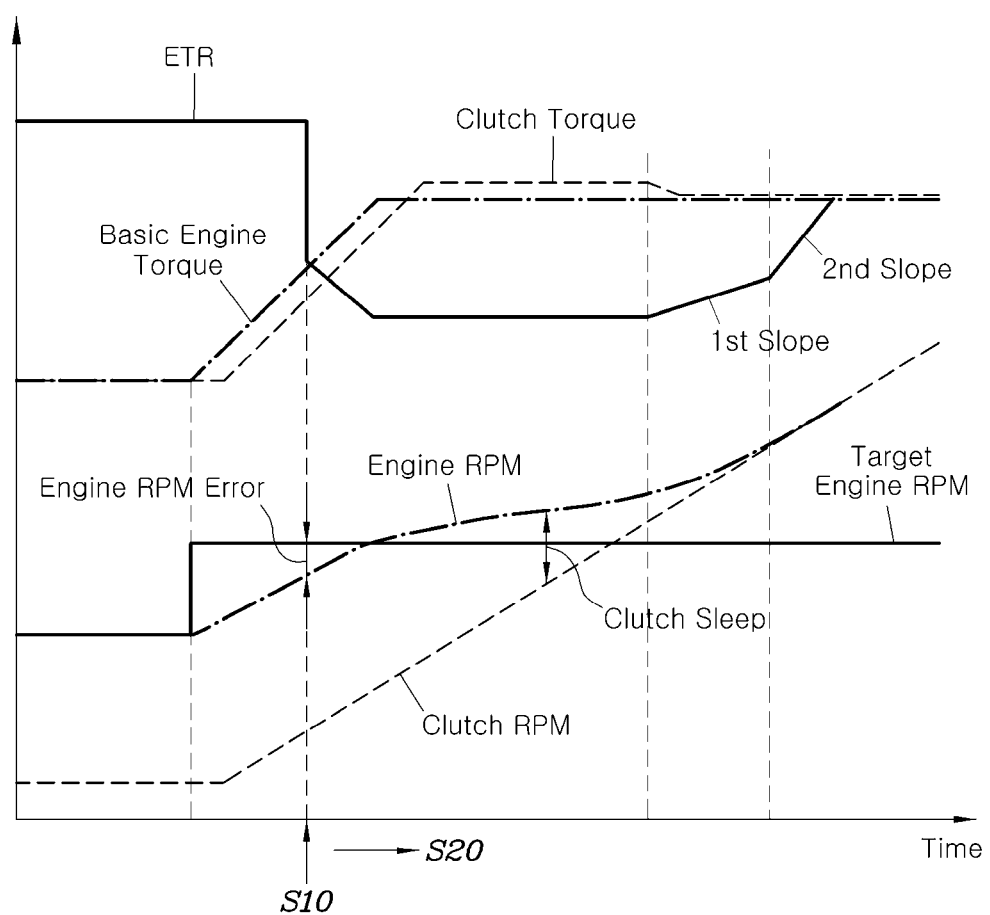
FIG. 4 is a graph illustrating a vehicle start control method according to an exemplary embodiment of the present disclosure.

Referring to FIGS. 2 to 4, a vehicle start control method according to an exemplary embodiment of the present disclosure includes: a condition determination step (S10) of determining, by the controller CLR, whether or not it is necessary to control an engine torque in addition to a slip control of the clutch when the vehicle has started to move (S1); and an engine control step (S20) of controlling, by the controller CLR, the engine torque according to an engine error revolutions per minute (RPM) which is a difference between a target engine RPM and an actually measured engine RPM, when it is necessary to additionally control the engine torque.

That is, when the vehicle has started moving, the engine torque is controlled to be suitable for a vehicle start control situation in addition to performing the vehicle starting by only controlling the clutch as in the prior art, thereby making it possible to actively cope with the uncertainty of clutch transmission torque as well as the uncertainty of engine torque, so that more stable and smooth vehicle starting can be realized.

Referring to FIG. 2, at the vehicle start time, the controller CLR calculates a feedforward component of the clutch torque to control the clutch according to the target engine RPM, a change amount in the target engine RPM, and an initial engine torque, calculates a feedback component to feedback control the clutch torque according to the engine error RPM, and controls the clutch using a value obtained by adding the feedback component to the feedforward component.

The calculation of the feedforward component and the calculation of the feedback component may be performed according to a conventional technique. In FIG. 2, the value obtained by adding the feedforward component and the feedback component is passed through the torque filter, so that a sudden torque change can be prevented.

In the control of the clutch, the slip amount of the clutch may be fed back to control the clutch torque accordingly.

Herein, the "target engine RPM" means a value calculated by the EMS on the basis of an accelerator pedal operation amount made by the driver and various pieces of other vehicle information, and the "basic engine torque" means a basic torque input into the DCT or the AMT from the engine.

That is, the basic engine torque means a basic engine torque input into the DCT or the AMT as the EMS determines by itself on the basis of an APS signal or the like and controls the engine under the situation where the controller CLR does not request the EMS to adjust the engine torque according to the shift state of the vehicle.

In the condition determination step (S10), when the slip amount of the clutch according to the vehicle starting is equal to or greater than a predetermined first reference value, the engine error RPM is equal to or greater than a predetermined second reference value, and the change amount in the engine RPM is equal to or greater than a predetermined third reference value, it may be determined that the engine torque needs to be further controlled.

Alternatively, in addition to the foregoing, as exemplified in FIG. 3, it may be additionally determined whether or not a Traction Control System (TCS) is in the OFF state and whether or not a Hill-start Assist Control (HAC) is in the OFF state, and when both the TCS and the HAC are in the OFF state, it may be determined that the engine torque needs to be additionally controlled.

This is to avoid the following situation: under the situation where a device such as the TCS is operated, the execution of the present disclosure may be hindered due to the exhibition of the function of the device, and an error may occur.

Based on the first reference value, it may be expected that the slip amount of the clutch is relatively large and relatively much time remains until the vehicle continues moving after initial starting of the vehicle, and the first reference value may be used to determine whether or not the start control needs to be performed through the positive engine torque control according to the present disclosure. For this, the first reference value may be determined in a design manner through an experiment and analysis.

The second reference value is used to determine whether a difference between the target engine RPM and the actually measured engine RPM is relatively large so that the positive engine torque control according to the present disclosure is required. For this, the second reference value may also be determined in a design manner through an experiment and analysis.

As described above, the third reference value can be used to determine whether the change amount in the engine RPM is equal to or more than a certain amount so that the positive engine torque control according to the present disclosure is required. Accordingly, the third reference value may be determined in a design manner through an experiment and analysis.

In the engine control step (S20), a proportional component and an integral component corresponding to the engine error RPM may be obtained separately, and the engine torque may be controlled using the value obtained by subtracting the proportional component and the integral component from the basic engine torque. The proportional component according to the engine error RPM and the integral component according to the engine error RPM may be determined by separate maps, respectively.

Similar to the conventional proportional integral feedback control, a map for obtaining the proportional component and a map for obtaining the integral component may be determined in advance through a number of experiments and analyzes so as to determine the amount of engine torque to be controlled according to the engine error RPM and be stored so that they can be used by the controller CLR.

Alternatively, the proportional component and the integral component may be obtained from a three-dimensional map of the proportional component according to the engine error RPM and the filtered engine error RPM change rate and a three-dimensional map of the integral component according to the engine error RPM and the filtered engine error RPM change rate, respectively, so that the engine torque can be controlled using a value obtained by subtracting the proportional component and the integral component from the basic engine torque.

After then engine control step (S20) has been initiated, the slip amount of the clutch is compared with a predetermined fourth reference value (S30)

When the slip amount of the clutch becomes less than the fourth reference value (S30), the engine torque is raised with a predetermined first slope while the reduction in the engine torque is reduced (S40).

This is to return the engine torque to the basic engine torque gradually from the time at which the vehicle starting reaches the last period as the engine control step (S20) is initiated and proceeded. Accordingly, the fourth reference value may be determined in a design manner through experiment and analysis to a level at which it become possible to determine whether or not the vehicle start process comes to the last period and the engine torque is gradually returned to the basic engine torque. According to the purpose described above, the first slope is set to a level at which the rapid increase of the engine torque can be avoided and a gradual rise of the engine torque can be realized as the vehicle starting is completed.

After the engine torque has been raised, it is determined whether the vehicle has been started moving and has continued running (S50).

When it is determined that the vehicle has been continued moving after the engine torque has been started to rise with the first slope, the engine torque is raised with a predetermined second slope while the amount of the ETR is reduced so as to converge to the basic engine torque (S60).

On the other hand, in the condition determination step S10, if the slip amount of the clutch according to the vehicle starting is less than the predetermined first reference value, the engine error RPM is less than the predetermined second reference value, and the change amount in the engine RPM is less than the predetermined third reference value, no request for reducing the engine torque is applied (S70).

When it is determined that the slip of the clutch becomes zero, the controller CLR may determine that the vehicle has been continued moving.

That is, when the slip of the clutch becomes 0, the controller CLR determines that the vehicle has been continued moving, and causes the engine torque to increase with the second slope and finally to converge to the basic engine torque, thereby ultimately releasing the engine torque controlled by the present disclosure to complete the execution of the present disclosure.

Here, the second slope may be set to a value larger than that of the first slope as illustrated in FIG. 4 so as to make the engine torque quickly return to the basic engine torque.

This is because, after the slip of the clutch has already become 0 or a similar situation occurs and the vehicle start control has been substantially terminated, even if the engine torque is increased somewhat rapidly, shocks or other side effects are less likely to occur.

The controller CLR can perform the engine control step S20 by requesting the EMS to control the engine torque in the engine control step S20.

That is, when the controller CLR calculates the proportional component and the integral component according to the engine error RPM and request the EMS with an Engine Torque Reduction (ETR) signal to reduce the engine torque corresponding to the sum of the components, the EMS sets a new target engine torque by reducing the basic engine torque, which has been determined by the EMS itself on the basis of the APS signal or the like, by the engine torque corresponding to the ETR signal requested from the controller CLR and controls the engine accordingly, whereby the engine torque is substantially controlled.

As described above, according to the present disclosure, at the vehicle start time, clutch torque as well as engine torque is also controlled, so that a more stable vehicle start process can be realized, thereby improving the merchantability of the vehicle.

While the present disclosure has been illustrated and explained with respect to specific embodiments thereof, it will be obvious to a person ordinarily skilled in the art that the present disclosure can be variously modified and changed without departing from the scope of the technical idea of the present disclosure, which is defined by the accompanying claims.

What is claimed is:
1. A vehicle start control method comprising:
  a condition determination step of determining, by a controller, whether or not it is necessary to control an engine torque in addition to a slip control of a clutch when a vehicle has started moving; and
  an engine control step of controlling, by the controller, the engine torque according to an engine error revolutions per minute (RPM) which is a difference between a target engine RPM and an actually measured engine RPM, when it is necessary to control the engine torque in addition to the slip control.

2. The vehicle start control method of claim 1, wherein, in the condition determination step, when a slip amount of the clutch according to the starting of the vehicle is equal to or greater than a first reference value, the engine error RPM is equal to or greater than a second reference value, and a change amount in the engine RPM is equal to or greater than a third reference value, the engine torque needs to be controlled in addition to the slip control.

3. The vehicle start control method of claim 2, wherein, in the condition determination step, it is determined whether or not a traction control system (TCS) is in an OFF state and whether or not a hill-start assist control (HAC) is in an OFF state, and
when both the TCS and the HAC are in the OFF state, the engine torque needs to be additionally controlled.

4. The vehicle start control method of claim 1, wherein, in the engine control step, a proportional component and an integral component corresponding to the engine error RPM are separately obtained, and the engine torque is controlled using a value obtained by subtracting the proportional component and the integral component from a basic engine torque which is input into a transmission from an engine.

5. The vehicle start control method of claim 4, wherein the proportional component and the integral component are determined by separate maps, respectively.

6. The vehicle start control method of claim 1, wherein, in the engine control step, a proportional component is obtained from a three-dimensional map of the proportional component according to the engine error RPM and a filtered engine error RPM change rate, and an integral component is obtained from a three-dimensional map of the integral component according to the engine error RPM and the filtered engine error RPM change rate, so that the engine torque is controlled using a value obtained by subtracting the proportional component and the integral component from a basic engine torque.

7. The vehicle start control method of claim 1, wherein, when a slip amount of the clutch becomes less than a fourth reference value after the engine control step is initiated, the engine torque is increased with a first slope.

8. The vehicle start control method of claim 7, wherein, when the vehicle continues moving after the starting of the vehicle and the engine torque has been started to rise with the first slope, the engine torque is raised with a second slope so as to converge to a basic engine torque.

9. The vehicle start control method of claim 8, wherein, when the slip amount of the clutch becomes zero, the controller determines that the vehicle has been continued moving after the starting of the vehicle.

10. The vehicle start control method of claim 1, wherein the controller executes the engine control step by requesting an engine management system (EMS) to control the engine torque.

11. The vehicle start control method of claim 1, wherein the controller calculates a feedforward component of an clutch torque to control the clutch according to the target engine RPM, a change amount in the target engine RPM, and a basic engine torque, calculates a feedback component to feedback control the clutch torque according to the engine error RPM, and controls the clutch using a value obtained by adding the feedback component to the feedforward component.

* * * * *